(12) United States Patent
Hiebl

(10) Patent No.: US 6,177,766 B1
(45) Date of Patent: Jan. 23, 2001

(54) CONTROL DEVICE FOR THE SIGNAL LIGHTS OF A MOTOR VEHICLE

(75) Inventor: Johann Hiebl, Bernhardswald (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/394,194

(22) Filed: Sep. 10, 1999

(30) Foreign Application Priority Data

Sep. 10, 1998 (DE) .............................................. 198 41 488

(51) Int. Cl.$^7$ ...................................................... B60Q 1/38
(52) U.S. Cl. ........................... 315/82; 307/10.8; 340/461; 340/474; 315/77
(58) Field of Search ................................ 315/82, 77, 217, 315/72, 360, 362, 83, 78, 115, 460, 461, 464, 465, 474, 475; 340/468, 469, 456, 457.2; 307/10.6, 10.8, 10.1

(56) References Cited

U.S. PATENT DOCUMENTS 4,080,588 * 3/1978 Seitter et al. ........................ 315/217
5,473,306 * 12/1995 Adell ...................................... 315/82
5,555,502 * 9/1996 Opel .................................. 364/424.05

FOREIGN PATENT DOCUMENTS

| 2558717 | 7/1977 | (DE) . |
| 3724916A1 | 2/1989 | (DE) . |
| 0693399A2 | 1/1996 | (EP) . |

* cited by examiner

*Primary Examiner*—David Vu
*Assistant Examiner*—Wilson Lee
(74) *Attorney, Agent, or Firm*—Herbert L. Lerner; Laurence A. Greenberg; Werner H. Stemer

(57) ABSTRACT

A control device for signal lights has a fully electronic flasher unit for intermittently activating the signal lights of the motor vehicle. A relay that is present in the vehicle in any case for other purposes and is likewise activated intermittently by the flasher unit is used to acoustically indicate to the driver when the signal lights are switched on. The fully electronic flasher unit is highly reliable. The relay provides the familiar acoustic feedback.

4 Claims, 1 Drawing Sheet

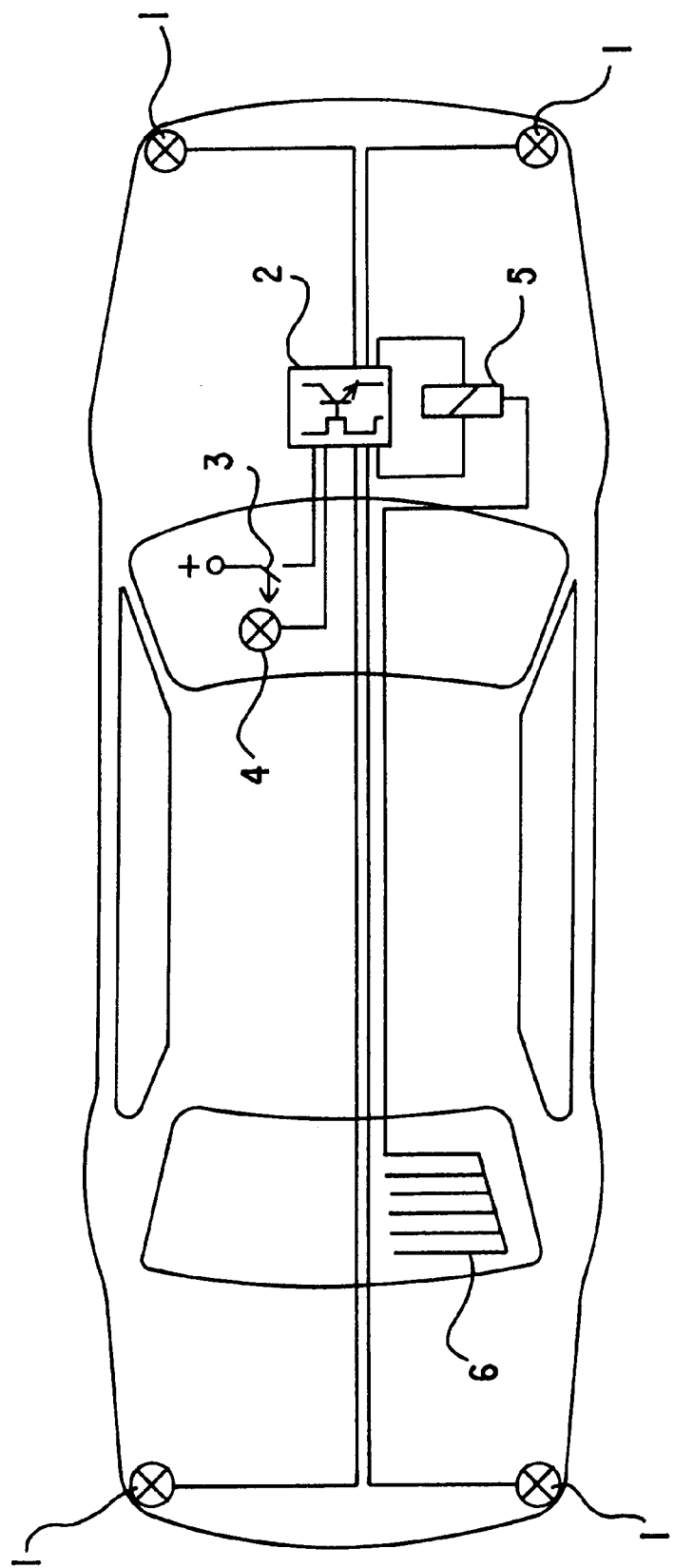

CONTROL DEVICE FOR THE SIGNAL LIGHTS OF A MOTOR VEHICLE

BACKGROUND OF THE INVENTION

Field of the Invention

The invention lies in the automotive technology field. More specifically, the invention relates to a control device for the signal lights of a motor vehicle, such as direction indicators and warning flashers.

Conventional control devices for the signal lights of a motor vehicle generally have a flasher unit, which switches signal lights on and off via relays. An optical display on the dashboard indicates to the driver whether direction indicators or warning flashers are switched on. The driver also receives acoustic feedback since a typical ticking or clicking noise arises as the relays are switched. In addition, the relay can also be designed as a buzzer. See U.S. Pat. No. 4,196,415 and German published patent application DE 25 58 717 A1.

Relays are increasingly being replaced by semiconductor switching elements since the latter are not as fault-prone as relays. See German published patent application DE 37 24 916 A1 and European published application EP 0 693 399 A2. Since there is no longer a relay, the acoustic feedback is produced by an electronic buzzer, which ensures that the driver hears a noise during the flashing. However, this involves an additional component as compared with the relay, which both switched the current and produced the acoustic feedback. Moreover, the noise does not correspond to the typical noise of a relay.

SUMMARY OF THE INVENTION

It is accordingly an object of the invention to provide a control device for the signal lights of a motor vehicle, which overcomes the above-mentioned disadvantages of the heretofore-known devices and methods of this general type and which is of simple construction and provides acoustic feedback to the driver when the signal lights are switched on.

With the foregoing and other objects in view there is provided, in accordance with the invention, a control device for the signal lights of a motor vehicle, comprising:

a fully electronic flasher unit for intermittently supplying signal lights of a motor vehicle with flasher current upon an actuation of an associated switch; and an electrical connection between the fully electronic flasher unit and a relay in the motor vehicle, for intermittently activating the relay and acoustically indicating an operation of the signal lights.

In accordance with an added feature of the invention, the flasher unit comprises an electronic control circuit with at least one clock generator and a transistor output stage producing the flasher current.

In accordance with a concomitant feature of the invention, the relay in the motor vehicle is a relay connected in a circuit for controlling one of a rear window heater and a seat heating system.

In summary, the invention is directed to a fully electronic flasher unit which switches signal lights on and off intermittently when the driver has manually actuated a corresponding switch (turn signal, emergency flashers). A relay that is present in the vehicle in any case for other purposes is used for the acoustic feedback, and the relay is likewise activated intermittently by the flasher unit.

Other features which are considered as characteristic for the invention are set forth in the appended claims.

Although the invention is illustrated and described herein as embodied in a control device for the signal lights of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing FIGURE.

BRIEF DESCRIPTION OF THE DRAWING

The single FIGURE is a schematic, plan view diagram of a control device according to the invention for the signal lights of a motor vehicle.

DESCRIPTION OF THE PREFERRED EMBODIMENTS

Referring now to the sole FIGURE of the drawing in detail, a control device according to the invention for the signal lights 1 of a motor vehicle has a fully electronic flasher unit 2. The flasher unit 2 has a transistor output stage which is connected to all the turn signal lights 1, generally on the left-hand and right-hand side at the front and on the left-hand and right-hand side at the rear of the motor vehicle.

When the driver actuates a switch 3 (such as a turn signal switch on the steering column or a warning signal flasher switch), the signal lights 1 are supplied intermittently with flasher current. The corresponding signal lights 1 light up in a predetermined flashing rhythm.

In addition, an optical indicator unit 4 is arranged within the view of the driver in the motor vehicle and indicates to the driver that the turn signal or warning flasher switch is switched on, likewise in the flashing rhythm.

According to the invention, the flasher unit 2 is connected to a relay 5 which is present in the motor vehicle in any case in order to provide acoustic feedback for the driver. This relay 5 is controlled by the flasher unit 2, likewise in the blinking rhythm, with the result that it switches on and off intermittently. This produces the flasher noise familiar to the driver (although by means of a different relay to that in conventional flasher systems).

The relay 5 that is "misused" to produce the flasher noise may be present in any case to control the rear window heater 6 or the seat heating system. It is also possible for other relays in the motor vehicle to be used for this purpose. If the relay 5 is used to produce the acoustic signals as an indicator unit for the driver, the original control function of the relay 5 should either be suppressed or barely noticeable, if at all, by the driver during flashing. The supply of an acoustic signal by the "misused" relay 5 does not have a negative effect on the operation of the motor vehicle.

The flasher unit 2 is designed as a fully electronic control circuit which has a clock generator and power transistors as the output stage. The power transistors are used to control the signal lights 1 in the vehicle and supply them with intermittent flasher current.

The flasher unit 2 can furthermore have a monitoring circuit, which monitors the signal lights 1 for failure. If one of the lights fails, the flashing frequency can be increased. At the same time, the relay 5 can likewise be activated with a significant change in frequency in the case of a malfunction, allowing the defect to be detected by means of the acoustic feedback as well.

The control device according to the invention is very reliable since an electronic circuit with semiconductors is used as a control circuit. The familiar acoustic feedback for the driver is accomplished without any extra outlay since a relay 5 which is present in any case in the motor vehicle for other purposes is used. As a consequence, the driver can hear clearly the clicking noise familiar to him or her.

The control circuit can be integrated simply in a central control unit which controls other functions of the motor vehicle for the windshield wipers, the fan, the air-conditioning system, the interior lighting, the locking system, and the like.

It is advantageous if only those relays 5 which control electrical devices whose operation is only noticed by the driver after some delay are used as the acoustic indicator unit. Such functions typically include the rear window heater 6 or the seat heating system. Some minutes may pass before the driver notices that the rear window heater 6 or the seat heating system is switched on. These relays 5 are therefore particularly suitable for activation as acoustic indicator units by the flasher unit 2 to produce the typical clicking noise of a conventional flasher relay. In the case of such relays 5, therefore, the usual functions can be switched on together with the flashing.

The control device according to the invention can also be used to control and monitor signal lights 1 of a trailer coupled to the motor vehicle.

It is not absolutely essential that the switch 3 should be actuated manually to switch on the signal lights 1. Thus, in the event of danger, for example, the warning flasher system and hence all the signal lights 1 can be switched on automatically under the control, for example, of the brake system or the airbag control system. Here too, the flasher unit 2 activates the signal lights 1 and the relay 5 intermittently.

What is claimed is:

1. A control configuration for signal lights of a motor vehicle, comprising:

a relay in a motor vehicle connected to control a device other than signal lights of the motor vehicle; and a fully electronic flasher unit for intermittently supplying signal lights of a motor vehicle with flasher current upon an actuation of an associated switch, said flasher unit electrically connected to said relay for intermittently activating said relay to acoustically indicate operation of the signal lights.

2. The control configuration according to claim 1, wherein said flasher unit comprises an electronic control circuit with at least one clock generator and a transistor output stage producing the flasher current.

3. The control configuration according to claim 1, wherein the device controlled by said relay is a device selected from the group consisting of a rear window heater and a seat heating system.

4. The control configuration according to claim 1, wherein said flasher unit comprises an electronic control circuit with a transistor output stage producing the flasher current.

* * * * *